United States Patent
Van Vooren

(10) Patent No.: US 9,795,083 B2
(45) Date of Patent: Oct. 24, 2017

(54) VERTICALLY AND ROTATABLY MOVEABLE HEADER WING

(71) Applicant: CNH INDUSTRIAL AMERICA LLC, New Holland, PA (US)

(72) Inventor: Sandor Van Vooren, Sijsele-Damme (BE)

(73) Assignee: CNH Industrial America LLC, New Holland, PA (US)

( * ) Notice: Subject to any disclaimer, the term of this patent is extended or adjusted under 35 U.S.C. 154(b) by 86 days.

(21) Appl. No.: 14/850,603

(22) Filed: Sep. 10, 2015

(65) Prior Publication Data

US 2016/0066508 A1     Mar. 10, 2016

(30) Foreign Application Priority Data

Sep. 10, 2014   (BE) ................ BE2014/0679

(51) Int. Cl.
  *A01B 49/00*   (2006.01)
  *A01D 41/14*   (2006.01)
  *A01B 73/06*   (2006.01)

(52) U.S. Cl.
  CPC ............ *A01D 41/144* (2013.01); *A01B 73/06* (2013.01)

(58) Field of Classification Search
  CPC ..... A01B 73/02; A01B 73/005; A01B 73/065; A01B 73/044; A01B 73/046; A01B 73/048; A01D 41/144; A01D 45/021; A01D 41/14
  USPC ....................................................... 172/311
  See application file for complete search history.

(56) References Cited

U.S. PATENT DOCUMENTS

| | | | | |
|---|---|---|---|---|
| 3,258,901 A | * | 7/1966 | Van der Lely | ......... A01D 41/14 56/2 |
| 3,262,254 A | * | 7/1966 | Van der Lely | ......... A01D 34/03 172/456 |
| 3,345,808 A | * | 10/1967 | Van der Lely | ....... A01D 34/246 56/10.2 R |
| 3,468,107 A | * | 9/1969 | Van der Lely | ....... A01D 41/144 56/11.9 |

(Continued)

FOREIGN PATENT DOCUMENTS

| | | |
|---|---|---|
| DE | 10040056 A1 | 2/2002 |
| DE | 102004022534 A1 | 12/2005 |

(Continued)

*Primary Examiner* — Arpad Fabian-Kovacs
(74) *Attorney, Agent, or Firm* — Peter K. Zacharias; Patrick M. Sheldrake

(57) ABSTRACT

A header bar assembly has a row of header bar elements mounted on a fixed header bar section. The assembly includes a first moveable wing having mounted thereon one or more further header bar elements, the fixed header bar section supporting at the first end a first pillar extending generally perpendicular to the fixed header bar section and via which the first moveable wing is retained moveably captive relative to the fixed header bar section. The first moveable wing is moveable relative to the first pillar vertically and rotatably from an operative, deployed position in which it extends generally parallel to the fixed header bar section to a stowed position through vertical movement on the first pillar and rotation such that the first moveable wing lies adjacent the fixed header bar section inboard of the first pillar.

9 Claims, 3 Drawing Sheets

(56) References Cited

U.S. PATENT DOCUMENTS

| | | | |
|---|---|---|---|
| 3,540,195 A * | 11/1970 | Van der Lely | A01D 57/30 56/10.7 |
| 3,683,601 A * | 8/1972 | Van der Lely | A01D 41/144 56/6 |
| 4,316,511 A * | 2/1982 | Andersen | A01B 73/044 172/456 |
| 4,320,805 A | 3/1982 | Winter | |
| 4,355,690 A | 10/1982 | Jensen et al. | |
| 4,409,780 A * | 10/1983 | Beougher | A01B 73/02 172/456 |
| 4,487,004 A * | 12/1984 | Kejr | A01D 41/14 56/14.4 |
| 4,721,168 A * | 1/1988 | Kinzenbaw | A01B 73/005 111/57 |
| 4,903,470 A * | 2/1990 | Hemker | A01D 41/144 172/311 |
| 5,329,753 A | 7/1994 | Arnold et al. | |
| 5,346,019 A * | 9/1994 | Kinzenbaw | A01C 7/208 111/57 |
| 5,673,543 A | 10/1997 | Richardson et al. | |
| 5,724,798 A * | 3/1998 | Stefl | A01D 41/144 172/311 |
| 5,845,472 A | 12/1998 | Arnold | |
| 5,911,625 A * | 6/1999 | von Allworden | A01D 41/144 460/119 |
| 5,960,618 A * | 10/1999 | Kerber | A01D 45/021 56/119 |
| 6,206,105 B1 * | 3/2001 | Friesen | A01B 73/065 111/54 |
| 7,043,889 B2 * | 5/2006 | Rauch | A01D 41/144 56/15.9 |
| 7,360,351 B2 * | 4/2008 | Rickert | A01D 41/144 56/228 |
| 7,614,206 B2 * | 11/2009 | Tippery | A01D 41/144 56/15.8 |
| 7,992,372 B1 | 8/2011 | Coers et al. | |
| 8,091,331 B2 * | 1/2012 | Dow | A01B 73/02 56/192 |
| 9,173,345 B2 * | 11/2015 | Cressoni | A01D 41/144 |
| 2002/0017090 A1 | 2/2002 | Hockenbeck | |
| 2002/0035826 A1 * | 3/2002 | Albinger | A01D 41/144 56/109 |
| 2003/0041579 A1 * | 3/2003 | Wuebbels | A01D 41/144 56/15.2 |
| 2003/0182912 A1 * | 10/2003 | Boll | A01D 34/661 56/14.7 |
| 2003/0226342 A1 * | 12/2003 | Boeckmann | A01D 45/021 56/14.7 |
| 2004/0123575 A1 * | 7/2004 | Rickert | A01D 41/144 56/14.7 |
| 2005/0028509 A1 * | 2/2005 | Viaud | A01D 41/148 56/341 |
| 2005/0109001 A1 * | 5/2005 | Wolters | A01D 57/22 56/16.4 R |
| 2006/0196161 A1 | 9/2006 | Krone et al. | |
| 2006/0225900 A1 | 10/2006 | Kimball | |
| 2007/0204583 A1 * | 9/2007 | Coers | A01D 61/002 56/14.4 |
| 2008/0072560 A1 * | 3/2008 | Talbot | A01D 41/14 56/208 |
| 2008/0168755 A1 | 7/2008 | Rickert et al. | |
| 2008/0295473 A1 | 12/2008 | Tippery et al. | |
| 2011/0078988 A1 * | 4/2011 | Roberge | A01D 41/144 56/13.6 |
| 2011/0315411 A1 * | 12/2011 | Adams | A01B 73/02 172/311 |
| 2013/0081829 A1 | 4/2013 | Tuttle et al. | |
| 2014/0033670 A1 | 2/2014 | Cressoni | |
| 2014/0075906 A1 * | 3/2014 | Heim | A01D 61/004 56/105 |
| 2014/0075907 A1 * | 3/2014 | Ritter | A01D 45/025 56/105 |
| 2014/0075909 A1 * | 3/2014 | Bomleny | A01D 41/144 56/119 |

FOREIGN PATENT DOCUMENTS

| | | |
|---|---|---|
| DE | 102008042392 A1 | 4/2010 |
| EP | 0789990 A1 | 8/1997 |
| EP | 0875132 A1 | 11/1998 |
| EP | 1169906 A1 | 1/2002 |
| EP | 1305995 A1 | 5/2003 |
| EP | 1932416 A1 | 6/2008 |
| EP | 2111740 A1 | 10/2009 |

* cited by examiner

VERTICALLY AND ROTATABLY MOVEABLE HEADER WING

This application claims priority to Belgium Application BE2014/0679 filed Sep. 10, 2014, which is incorporated herein by reference in its entirety.

FIELD OF THE INVENTION

The invention concerns a header bar assembly and a method of its use. The invention also relates to a vehicle including a header bar.

BACKGROUND OF THE INVENTION

Several types of agricultural harvesting vehicle include header bar assemblies. Most commonly they are encountered in combine harvesters, although variants on the basic design of header bar are also found in other harvesting vehicles such as beet harvesters, pea/bean harvesters and forage harvesters. The invention is applicable in all types of harvesting machine as are summarised above.

In, e.g., corn headers, the header bar assembly comprises a number of row units, placed side by side and each being arranged for harvesting a row of corn plants. Corn plants are typically planted in rows spaced a predetermined distance apart. Row units of corn headers are spaced a corresponding distance apart so as to be capable of following the rows while inducting the corn plants. When entering and moving through a stand of corn, the row units of the header are typically preceded by row dividers that separate the adjacent rows of plants for harvesting by the respective row units. The row units are configured and operable for receiving the stalks of the corn plants of the respective rows in succession, and removing the full or intact ears of corn, for conveying by other apparatus from the header to processing apparatus within the harvesting machine. Typically, the row units can comprise a variety of devices operable for harvesting the corn ears from the stalks, including deck plates defining a stalk receiving channel, gathering chains having teeth operable for carrying the corn ears rearward to a conveying apparatus of the header and snapping rolls located in association with the deck plates for pulling the corn stalks downwardly. In a typical configuration, the gathering chains are located above the deck plates and the snapping rolls are located below. The snapping rolls are rotatable for pulling the corn stalk downwardly, through rearward moving fingers of the gathering chains, to bring the ears to bear against the top edges of the deck plates so as to be detached from the stalks thereby. The detached ears are then carried toward the rear of the header by the gathering chains for conveying by other apparatus into the harvesting machine, while the collapsed stalks are left on the field.

In nearly all agricultural harvesting vehicles the header bar assembly is considerably wider than the body of the vehicle. This is so that the harvesting machine can harvest multiple rows of crop at a time, without the capacity of the machine being limited by the width of the vehicle body.

The width of header bar designs therefore is a significant advantage from the standpoint of harvesting efficiency, but it represents a drawback when the harvesting vehicle is required to travel on roads (as is commonly the case e.g. at the end of a working shift or when the harvester is required to move from one farm to another).

This is because the header bar assembly is significantly wider than a typical road carriageway. A harvesting machine travelling on a road with a header bar assembly extending laterally as is required during harvesting operations would be entirely impractical since the header bar assembly would foul on objects at the side of the road, and the passage of other vehicles would be impeded by the length of the header bar that extends out of the carriageway in which the harvesting machine is moving. Furthermore many narrow rural roads would be impenetrable to a harvesting machine having its header bar configured for harvesting operations.

In some corn header designs it is known for the header bar assembly to be segmented, with sections known as "wings" at each end of the header bar assembly being pivotable along a vertically extending arc to overlie a mid-section during on-road driving of the harvesting machine. Regulatory requirements in many European countries dictate that when folded up in this way the maximum width of the header bar assembly must not exceed 3.5 m. Movement of the wings to the stowed position requires their inversion.

This solution is associated with disadvantages. Primary among these is a restriction that the sum of the width of the two wings cannot be greater than the width of a fixed central section of the header bar. Otherwise, the wings would overlap each other when folded and the associated drive mechanisms may not function correctly.

Another disadvantage is the energy requirement to cause inversion of the wings as they rotate round the vertical arc. This means the harvesting machine must be fitted with a drive take-off that applies the drive normally provided for the purpose of driving moveable parts of the header bar assembly for the purpose of inverting the wings and causing them to overlie the fixed central section of the header bar.

The mass of each wing is significant. This means that the components that support them and transfer drive to them during their inversion and rotation must be robust and heavy. The power requirement for folding the wings is high, and the folding operation may be relatively slow to complete.

Publication no EP 1932416 A1 proposes a different solution to the problem of header bar width. The harvester disclosed in this document includes a segmented header bar assembly in which wings including reel segments are pivotable about vertical axes so as to protrude forwardly of a fixed central header bar section when the harvester is required to travel on roads. Motor drives are provided for rotating the wings in a horizontal arc.

Although as a result of such motion the header bar width is reduced to less than that of the harvester vehicle body, the harvester of EP 1932416 A1 appears to suffer from several disadvantages.

Among these is the fact that the wings in their folded configuration are cantilevered forwardly from the fixed header bar section. This means that the parts of the header bar and drive connections that support the wings must be particularly strong. In turn this can represent a weight disadvantage that in turn adversely affects factors such as vehicle speed, manoeuvrability and fuel consumption.

Also the header bar and the remainder of the vehicle must be carefully designed since otherwise the centre of mass of the vehicle may shift undesirably as conversion between the harvesting and driving configurations takes place. This may cause the harvester to behave in ways that are unfamiliar to an operator e.g. when driving on roads.

The arc described by the wings as they move between the folded and deployed positions is large. It is necessary for the harvester operator to clear a large area near the front of the harvester of obstructions and people before converting the machine between its two main configurations.

Once the wings are folded as noted they protrude forwardly of the central section by some distance. This means that the harvester vehicle is somewhat longer when prepared for road driving than when configured for harvesting. This is believed potentially to lead inexperienced operators to misjudge the vehicle length. Moreover in some jurisdictions vehicle regulations limit the extent to which parts of a vehicle such as a harvester protrude forwardly relative to some datum such as the cab-mounted steering wheel normally in use during road driving. It may be difficult for a vehicle designer adopting the principles described in EP 1932416 A1 to meet such requirements.

SUMMARY OF THE INVENTION

According to the invention in a first broad aspect there is provided a header bar assembly comprising a row of header bar elements mounted on a fixed header bar section, the assembly including at at least a first end of the fixed header bar section a first moveable wing having mounted thereon one or more further header bar elements, the fixed header bar section supporting at the first end a first pillar extending generally perpendicular to the fixed header bar section and via which the first moveable wing is retained moveably captive relative to the fixed header bar section, the first moveable wing being moveable relative to the first pillar vertically and rotatably from an operative, deployed position in which it extends generally parallel to the fixed header bar section to a stowed position through vertical movement on the first pillar and rotation such that the first moveable wing lies adjacent the fixed header bar section inboard of the first pillar.

An advantage of this arrangement is that by moving the wings vertically as part of a stowing movement there is a reduced danger, compared with prior art header bars, of the wing striking an object at ground level during subsequent rotations even when, as in preferred embodiments of the invention, the rotations are through horizontal arcs.

References to a header bar section that is "fixed" are relative. As a consequence it is not essential that the fixed header bar section is completely immovable relative to the remainder of the harvester; and instead the term may embrace within its scope e.g. a moveable partly flexible header bar section that while in use remaining generally in the same location may nonetheless be raised and lowered, or may flex, to accommodate ground undulations or objects that it strikes.

Preferably the header bar assembly includes at a second end of the fixed header bar section opposite the first end a second moveable wing having mounted thereon one or more further header bar elements, the fixed header bar section supporting at the second end a second pillar extending generally perpendicular to the fixed header bar section and via which the second moveable wing is retained moveably captive relative to the fixed header bar section, the second moveable wing being moveable relative to the second pillar vertically and rotatably from an operative, deployed position in which it extends generally parallel to the fixed header bar section to a stowed position through vertical movement on the second pillar and rotation such that the second wing lies adjacent the fixed header bar section inboard of the second pillar.

Thus in preferred embodiments of the invention the header bar assembly may be made as a symmetrical structure in which a respective moveable wing is located at each end of an elongate, central fixed header bar section.

The or each said movable wing can be movable from the stowed position through rotation of the or each moveable wing out of parallel with the fixed header bar section before the associated vertical movement.

Preferably the rotations of the or each wing are through horizontal arcs.

Conveniently the or each said pillar extends vertically upwardly relative to the fixed header bar section and indeed preferably is directly vertically extending. This assures the vertical initial movement of the or each wing on the pillar during movement from the deployed to the stowed configuration. Moreover in the stowed position the or each wing may readily be arranged to overlie an adjacent length of the fixed header bar section in a compact arrangement.

Even more preferably the or each said moveable wing is moveable from its stowed position to its deployed position through horizontal rotation relative to its associated said pillar away from the fixed header bar section, vertical movement on the said pillar and further horizontal rotation such that the moveable wing lies parallel to the fixed header bar section extending from a said end thereof. In other words the invention embraces within its scope those components needed to permit a reverse of the stowing operation in order to deploy the wings ready for harvesting to commence.

In preferred embodiments of the invention the header assembly includes a drive mechanism for causing movement of at least one said header bar element and at least one said further header bar element relative to the header bar, the header bar assembly including a respective drive coupler/decoupler disengaging the drive mechanism from the or each said further header bar element upon, during or before: (i) movement of the associated said wing between the deployed position and the stowed position; (ii) rotation of the associated said wing out of parallel with the fixed header bar section; (iii) vertical movement of the associated said wing; or (iv) rotation of the associated said wing such that the associated said wing lies adjacent the fixed header bar section inboard of the associated said pillar.

Further preferably the drive coupler/decoupler couples the drive mechanism to the further header bar elements of the or each said moveable wing when the or each said moveable wing lies parallel to the fixed header bar section extending from a said end thereof.

The arrangement of the invention therefore permits the application of (for example but not necessarily) rotational drive to one or more header bar elements supported by the wings when the latter are deployed, while permitting disengagement of such drive when it is required to stow the wings for road driving.

Conveniently the header bar assembly of the invention includes one or more motors connected to effect movement of the or each said moveable wing, for example vertical movement and/or rotational movement and/or any other movement of the or each said moveable wing. The motors can be dedicated to the provision of wing movement as described; or they can be multi-purpose. Thus in one form of the invention drive to effect wing movement may be by way of a power take-off from the engine of the harvester.

Regardless of the precise wing movement drive arrangement preferably the length of each said wing is less than half the length of the fixed header bar section. This means that both wings when stowed may be accommodated overlying the fixed header bar section.

The row of header bar elements may comprise forwardly projecting elements, which may be for engaging a crop to be harvested.

The invention also resides in a method of stowing a moveable wing of a header bar assembly according to the invention as defined hereinabove comprising the steps of causing rotation of a said moveable wing out of parallel with the fixed header bar section; causing vertical movement of the said moveable wing on a said pillar; and causing further rotation of the said moveable wing such that the moveable wing lies adjacent the fixed header bar section inboard of the said pillar.

The method of the invention preferably includes the step of causing disengagement of a drive mechanism for effecting movement of one or more said further header bar elements. This may conveniently be achieved through use of a coupler/decoupler as referred to above.

The invention additionally or alternatively includes a method of causing deployment from a stowed position to an operative position of a moveable wing of a header bar assembly according to the invention as defined hereinabove comprising the steps of causing rotation of the said moveable wing such that the moveable wing lies skewed relative to the fixed header bar section and extending therefrom; causing vertical movement of the said moveable wing on a said pillar; and causing further rotation of the moveable wing until it lies generally parallel with the fixed header bar section extending from an end thereof.

Preferably the method includes the step of causing engagement of a drive mechanism for effecting movement of one or more said further header bar elements relative to the header bar.

Thus the invention embraces within its scope deployment steps that are the reverse of stowage steps as described above.

The invention furthermore relates to a vehicle including a header bar assembly as defined herein.

The vehicle may include one or more sensors of the position of a said wing relative to the fixed header bar section, and optionally may also include one or more audible and/or visual indicators of the status of a said sensor.

BRIEF DESCRIPTION OF THE DRAWINGS

There now follows a description of a preferred embodiment of the invention, by way of non-limiting example, with reference being made to the accompanying drawings in which.

DETAILED DESCRIPTION OF EMBODIMENT(S)

Figure 1:
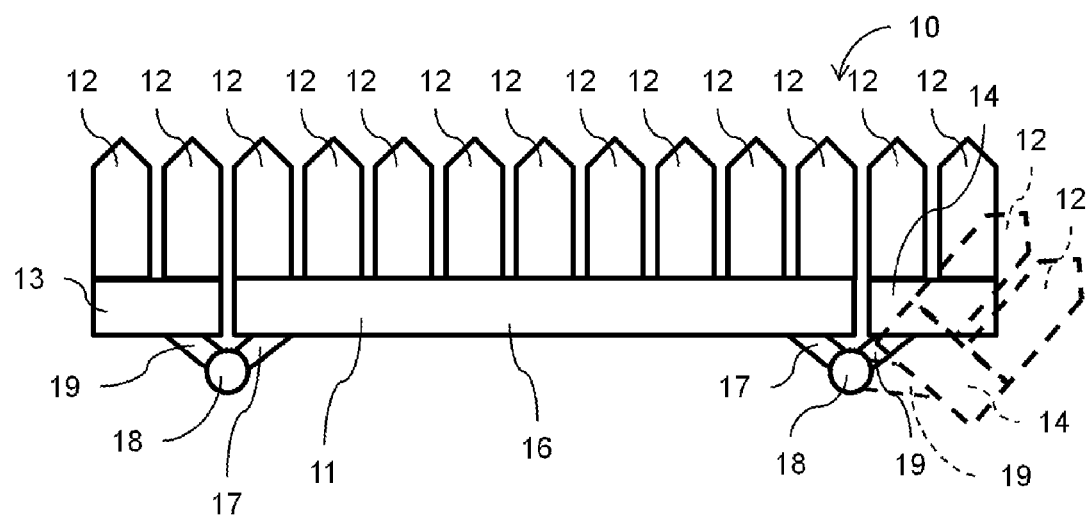
FIG. 1 is a schematic plan view from above of a header bar assembly in accordance with the invention showing in dotted lines a first stage of movement of a wing from a deployed position towards a stowed position.

Referring to the figures a header bar assembly 10 of a harvesting vehicle (the remainder of which for ease of illustration is omitted from the drawings) includes a horizontal central header bar section 16 or similar structure having projecting forwardly (as judged with reference to the normal forward and rearward directions of motion of the harvesting vehicle) a series of header bar elements. In the particular embodiment of the invention illustrated in the figures these are row units 12, which may also be referred to as corn heads. In other embodiments of the invention the header bar elements could be, for example, tines, knives, scissors or comb teeth.

At each lateral end the header bar assembly 10 includes a respective moveable wing 13, 14 each having mounted thereon one or more of the row units 12 so as to project forwardly in like manner to the remainder of the row units 12.

Each wing 13, 14 may be considered as a parallel lateral extension of the central header bar section 16. The arrangement therefore is that the header bar assembly 10 includes the central, fixed header bar section 16 that is flanked at either end by a respective moveable header bar section partly defining each wing 13, 14.

Adjacent each end the fixed header bar section 16 supports by way of a respective bracket 17 shown schematically in the drawings a vertically extending pillar 18. In the embodiment illustrated the pillar 18 in each case takes the form of a vertical, rigid cylindrical rod although this aspect of the invention may take a range of forms in other embodiments.

Each wing 13, 14 is retained moveably captive relative to the fixed header bar section 16 e.g. by means of a further bracket 19 that at one end is rigidly secured to the associated wing 13, 14 and at the opposite end terminates in an eye 20 that encircles the pillar 18 so as to provide for moveable retention of each wing relative to the fixed header bar section 16. As a result of this arrangement each wing 13, 14 is moveable both by rotating around the adjacent pillar 18 and through vertical sliding movement relative to the pillar, between a deployed position shown in FIG. 1 in which it is correctly located for harvesting operations and a stowed position shown on the right side of FIG. 3 that renders the header bar assembly more compact and hence makes the harvesting vehicle safe for road driving.

The harvesting vehicle including the header bar assembly 10 includes means for providing driving power to the row units 12 or other header bar elements that are required to move during harvesting activity. Such means are in general familiar to the person of skill in the art and are not described in detail herein nor shown in the drawings. Typically such driving power is provided by one or more drives such as shafts that couple rotational energy of the vehicle engine to the header bar elements.

Figure 3:
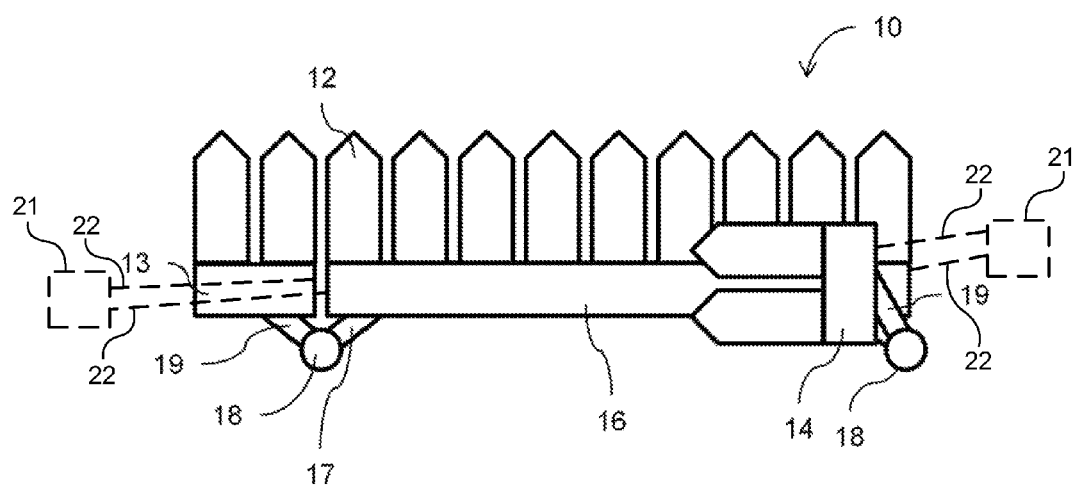
FIG. 3 is a view similar to FIG. 1 showing completion of the stowing steps.

At each end the header bar assembly 10 includes a respective coupler/decoupler 21 that for ease of understanding is shown in the drawings in schematic form in FIG. 3. The purpose of the coupler/decoupler 21 is to couple rotational drive, on a selective basis, to the header bar elements of the wings 13, 14 through engageable and disengageable connections shown as dashed lines 22 in FIG. 3.

The couplers/decouplers 21 may be provided as clutches to engage/disengage a drive mechanism mounted on the 12 respective wings 13, 14. Such a clutch may be a spring operated claw clutch. The couplers/decouplers 21 may disengage a drive mechanism from the row units 12 mounted on the respective wings 13, 14 upon, during or before: (i) rotation of the wing 13, 14 out of parallel with the fixed header bar section 16; (ii) vertical movement of the wing 13, 14; or (iii) any other movement of the wing 13, 14 between the deployed position and the stowed position.

The header bar assembly 10 includes one or more motors 23 or drive transfer arrangements for providing power to move the wings 13, 14 through mechanical interconnections 24 shown as dashed lines in FIG. 2 as described below. A first stage of movement is shown using dotted lines in respect of one of the wings 14 in FIG. 1. In practice both wings 13, 14 would be moved, optionally simultaneously, following activation of a single control element such as a cab-mounted lever or button in order to energise the motors or other drive transfer arrangements in order to alter the header bar from a deployed to a stowed configuration.

The header bar assembly 10 includes one or more motors 23 or drive transfer arrangements for providing power to move the wings as described below. A first stage of movement is shown using dotted lines in respect of one of the wings 14 in FIG. 1. In practice both wings 13, 14 would be moved, optionally simultaneously, following activation of a single control element such as a cab-mounted lever or button in order to energise the motors or other drive transfer arrangements in order to alter the header bar from a deployed to a stowed configuration.

Figure 2:
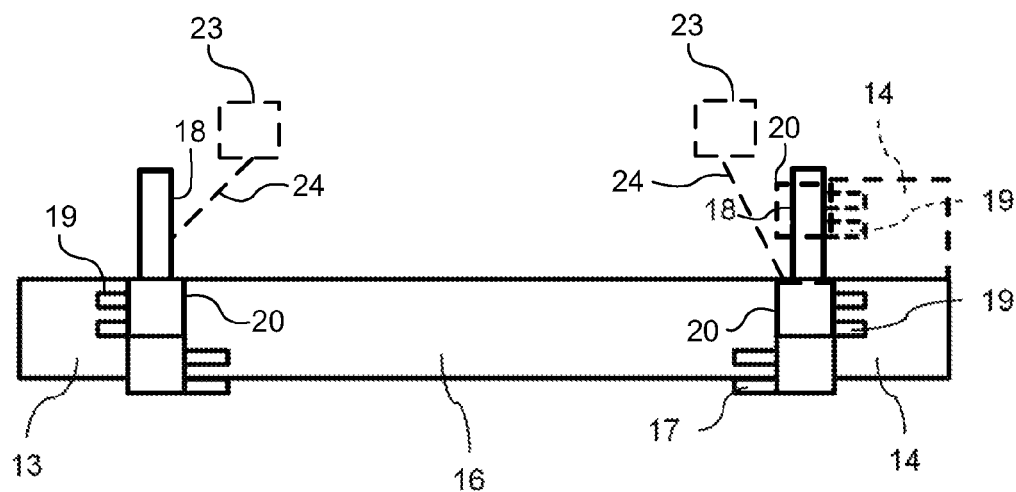
FIG. 2 is an elevational view from the rear of the FIG. 1 header bar assembly, showing a second stage of movement of the wing.

In a second stage, illustrated in stages in FIG. 2, each wing 13, 14 is raised vertically on the associated pillar under the influence of the motors, etc described above. This stage brings the underside of each wing 13, 14 clear of the top of the fixed header bar section 16. It then is possible for the wings 13, 14 to be rotated in the opposite direction to the initial, decoupling rotation until they overlie the fixed header bar section 16 as illustrated with respect to the right hand wing 14 in FIG. 3.

It is to be noted that the first stage of movement can be dispensed with when the decoupling of the drive elements and other connections between the central header bar section 16 and the wings 13, 14 can be realized with the wing 13, 14 still in its 'deployed' position, parallel to the central header bar section 16. This may, for example, be realized by using remotely retractable coupling mechanisms.

When thus configured on both sides the header bar assembly is compact and the harvesting vehicle therefore is suited for road driving. Movement from the deployed configuration of FIG. 1 to the stowed configuration of FIG. 3 is achieved without having to invert the wings. As a result the power and weight requirements of the header bar assembly 10 of the invention are less than those of the prior art arrangements. The wings however in the stowed position nonetheless overlie the fixed header bar section with the result that the centre of mass of the harvesting vehicle is essentially the same whether the header bar assembly 10 is configured for harvesting or road driving. Moreover in the stowed configuration no parts of the header bar assembly 10 protrude forwardly any further than when the assembly 10 is configured for harvesting.

Another advantage is that the sum of the width of the two wings 13, 14 does not need to be less than the width of the fixed header bar section 16. In practical examples, this can mean that the width of each of the wings 13, 14 is not restricted such that it must be less than half the width of the fixed header bar section 16. This is because the wings 13, 14 are located above the fixed header bar section 16 in a rotated orientation and therefore the width of the wings 13, 14 does not cause them to interfere with one another. In other words, because the wings 13, 14 are rotated, the width of the wings 13, 14, and therefore also the number of row units 12 that can be accommodated on the wings 13, 14 does not affect the transport width of the harvesting vehicle when the header bar 10 is folded for a road mode.

A further benefit of the invention, as noted herein, is that when rotating forwardly on the pillars the wings 13, 14 are in a raised position by reason of the vertical movement. This reduces the need for the harvesting machine to be on completely flat ground and/or for all objects in front of the header bar 10 to be cleared before conversion of the header bar commences.

Deployment of the wings 13, 14 to a harvesting configuration essentially is a reverse of the steps described above. Thus from the location depicted in FIG. 3 each wing 13, 14 initially rotates until it adopts the orientation visible in FIG. 1 before descending on the pillar 18 to its lowermost position. From this location each wing rotates in the opposite direction to that of its initial movement in order to align the wing-mounted row units for harvesting and simultaneously engage drive to them by way of the coupler/decoupler. The harvesting vehicle is then ready to undertake harvesting by moving forwardly through rows of crops.

A vehicle that includes a header bar assembly such as the one described above may also include one or more sensors of the position of one or both of the wings 13, 14 relative to the fixed header bar section 16. The vehicle may also include one or more audible and/or visual indicators of the status of a said sensor. Such sensors can beneficially be used to advise an operator of whether the wings 13, 14 are in the deployed position or the stowed position, thereby reducing the likelihood of the operator making a driving manoeuvre that is unsuitable for the position of the wings 13, 14.

The listing or discussion of an apparently prior-published document in this specification should not necessarily be taken as an acknowledgement that the document is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

The invention claimed is:

1. A header bar assembly comprising
   a row of header bar elements mounted on a fixed header bar section; and
   a first moveable wing having mounted thereon one or more wing header bar elements,
   wherein the fixed header bar section supports at a first end a first pillar extending generally perpendicular to the fixed header bar section and a first eye received over the first pillar and supporting the first moveable wing relative to the fixed header bar section, the first eye and the first moveable wing being moveable relative to the first pillar vertically and rotatably from an operative, deployed position in which the first movable wing is an extension of the fixed header bar section to a stowed position through vertical movement on the first pillar and rotation such that the first moveable wing lies adjacent the fixed header bar section inboard of the first pillar, and
   wherein the header bar assembly further comprises a motor mechanically connected to the first eye for rotating and elevating the first eye between the deployed position and the stowed position.

2. The header bar assembly according to claim 1, further comprising:
   at a second end of the fixed header bar section opposite the first end a second moveable wing having mounted thereon one or more header bar elements, the fixed header bar section supporting at the second end a second pillar extending generally perpendicular to the fixed header bar section and a second eye received over the second pillar and supporting the second moveable wing relative to the fixed header bar section, the second eye and the second moveable wing being moveable relative to the second pillar vertically and rotatably from an operative, deployed position in which the second moveable wing is an extension of the fixed header bar section to a stowed position through vertical movement on the second pillar and rotation such that the second moveable wing lies adjacent the fixed header bar section inboard of the second pillar; and a motor mechanically connected to the second eye for rotating and elevating the second eye between the deployed position and the stowed position.

3. The header bar assembly according to claim 1, wherein the first movable wing is movable from the stowed position through rotation of the first moveable wing out of parallel with the fixed header bar section before the vertical movement.

4. The header bar assembly according to claim 1, wherein the first pillar extends vertically upwardly relative to the fixed header bar section.

5. The header bar assembly according to claim 2, wherein the rotations of the first and second moveable wings are through horizontal arcs.

6. The header bar assembly according to claim 1, wherein the first moveable wing is moveable from its stowed position to its deployed position through horizontal rotation relative to the associated said first pillar away from the fixed header bar section, vertical movement on the first pillar, and further horizontal rotation such that the first moveable wing lies parallel to the fixed header bar section.

7. The header bar assembly according to claim 1, further comprising a drive mechanism for causing movement of at least one of the header bar elements and at least one of the one or more wing header bar elements relative to the header bar section, a respective drive coupler/decoupler disengaging the drive mechanism from the at least one of the one or more wing header bar elements upon, during, or before movement of the first moveable wing between the deployed position and the stowed position.

8. The header bar assembly according to claim 7, wherein the drive coupler/decoupler couples the drive mechanism to the at least one of the one or more wing header bar elements of the first moveable wing when the first moveable wing lies parallel to the fixed header bar section.

9. The header bar assembly according to claim 1, wherein the row of header bar elements comprises forwardly projecting elements for engaging a crop to be harvested.

* * * * *